United States Patent
Ohno et al.

[11] 3,864,315
[45] Feb. 4, 1975

[54] FIBER-FORMING POLYESTER COMPOSITION INCLUDING A POLYALKYLENE ETHER

[75] Inventors: Koji Ohno; Takaakira Tsuji; Nobusuke Takeuchi, all of Kurashiki City, Japan

[73] Assignee: Kuraray Co. Ltd., Okayama Prefecture, Japan

[22] Filed: Mar. 23, 1971

[21] Appl. No.: 127,340

[30] Foreign Application Priority Data
Mar. 23, 1970 Japan.......................... 45-24719
Mar. 23, 1970 Japan.......................... 45-24720

[52] U.S. Cl.................. 260/75 R, 8/179, 8/DIG. 4, 260/77, 260/76, 264/210 F
[51] Int. Cl........................ C08g 17/14, C08g 17/18
[58] Field of Search ................................. 260/75 R

[56] References Cited
UNITED STATES PATENTS

| | | | |
|---|---|---|---|
| 2,674,619 | 4/1954 | Lundsted et al. | 260/33.4 R |
| 2,718,509 | 9/1955 | Lundsted et al. | 260/33.2 R |
| 2,895,946 | 7/1959 | Huffman | 260/75 |
| 2,905,657 | 9/1959 | Huffman | 260/75 |
| 3,023,192 | 2/1962 | Shivers | 260/75 |
| 3,024,220 | 3/1962 | Cramer | 260/75 |
| 3,033,824 | 5/1962 | Huffman | 260/75 |
| 3,042,656 | 7/1962 | Frey | 260/77 |
| 3,291,845 | 12/1966 | Longley et al. | 260/75 X |
| 3,461,468 | 8/1969 | Morgan et al. | 260/75 X |

OTHER PUBLICATIONS
Encyclopedia of Chemical Technology, Vol. 15, 1969, Kirk et al., pp. 761-762 and 771.

Primary Examiner—Howard E. Schain
Attorney, Agent, or Firm—Sherman & Shalloway

[57] ABSTRACT

An aromatic dicarboxylic acid polyester modified with a compound having a polyalkylene ether group of the formula

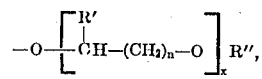

wherein R′ is a hydrogen atom or a lower alkyl group, n is an integer of 1 to 3, x is an integer of 1 to 50, R″ is a hydrogen atom, —COOH, —OH, —COOR‴, or —OOCR‴, wherein R‴ is a lower alkyl group; and fibers made therefrom.

7 Claims, No Drawings

FIBER-FORMING POLYESTER COMPOSITION INCLUDING A POLYALKYLENE ETHER

This invention relates to a fiber-forming polyester composition having improved dyeability and pilling resistance, a process for producing such composition, fibers and filaments made from such composition, and a process for producing such fibers and filaments.

Linear polyesters prepared from terephthalic acid and ethylene glycol and having recurring units expressed by the formula

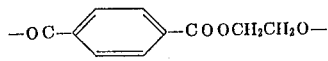

are well known, and it is known that these linear polyesters can be extruded in a molten state into a fiber form. It is also known that instead of the terephthalic acid, a symmetrical aromatic dicarboxylic acid such as naphthalene-2,6-dicarboxylic acid or diphenyldicarboxylic acid can be used, and other alkylene glycols having up to 12 carbon atoms can replace the ethylene glycol.

Synthetic fibers made from a polyester derived from the aromatic dicarboxylic acid possess high crystallinity and softening point, and also have superior mechanical properties, and resistance to chemicals, heat, hot water, and to light. They have therefore great utility in apparel and industrial applications.

In spite of the aforementioned merits, such polyester fibers have defects such as inferior dyeability and a pilling phenomenon that tends to occur when the fibers are processed into woven fabrics, and these defects set some limitation on the application of these fibers to the apparel field. In recent years, there has been a great demand for removing these defects that are detrimental to apparel applications.

Various attempts have already been made to improve the dyeability of fibers made from polyesters that are derived from aromatic dicarboxylic acids. For instance, Japanese Patent Publication No. 10794/59 discloses the modification of linear polyesters with monohydric polyalkylene oxides. If, however, the linear polyesters are modified with the monohydric polyalkylene oxides alone, a decrease in the rate of polymerization is observed, and such a method is not altogether satisfactory for improving the dyeability. There was also an attempt to improve the pilling resistance of polyester synthetic fibers by modifying the linear polyesters with a low-molecular-weight ester-forming functional compound (for instance, Japanese Patent Publication Nos. 4545/68 and 26972/69).

It is also known to modify linear polyesters with both the monohydric polyalkylene oxides and the low-molecular-weight ester-forming polyfunctional compounds in order to improve both the dyeability and pilling resistance. However, the bonding of the monohydric polyalkylene oxides tends to cause the formation of undesirable oligomers, and the resulting polymers have unsatisfactory quality.

Accordingly, an object of the present invention is to provide a polyester composition which can be formed into fibers having improved dyeability and pilling resistance.

Another object of the present invention is to provide a process for improving the dyeability and pilling resistance of polyester fibers.

It has been found that a polyester composition having incorporated therein a certain polyalkylene oxide compound containing at least three ester-forming groups per molecule obviates the aforementioned defects of the conventional modified polyesters, and gives polyester fibers having improved dyeability and pilling resistance.

According to the present invention, a polyester composition is provided comprising 1. a polyester component prepared from an aromatic dicarboxylic acid and an alkylene glycol of 2 to 10 carbon atoms and having recurring units of the formula $-O-(CH_2)_m-OOC-Ar-CO-$, wherein Ar is an aromatic nucleus and m is an integer of 2 to 10, 2. a polyalkylene oxide compound expressed by the general formula

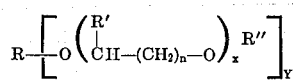

wherein R is a straight chain or cyclic aliphatic hydrocarbon or a Y-valent residue of an aliphatic ether, R' is a hydrogen atom or a lower alkyl group, n is an integer of 1 to 3, x is an integer of 1 to 50, R'' is a hydrogen atom or a hydrocarbon group with 1 to 10 carbon atoms having a carboxyl group or ester thereof, or a hydroxyl group or ester thereof, and Y is an integer of 3 to 6, and 3. an ester forming compound with at least 7 carbon atoms having one $-COOH$, $-OH$, $-COOR'''$ or $-OOCR'''$ per molecule, R''' being a lower alkyl group, the content of component (2) being not more than Y/Y $-$ 2 mole percent and not less than Y/15 (Y $-$ 2) mole percent based on the total acid component of the polyester, and the content of component (3) being O to Y times the weight of the component (2).

The polyester composition of the invention having improved dyeability and resistance to pilling consists basically of an aromatic carboxylic acid and a glycol component which are already known as ingredients for producing fiber-forming polyesters, and may contain small amounts of other dicarboxylic acid components and dihydroxy components.

The aromatic dicarboxylic acids that are used in the invention include terephthalic acid, napthalene-2,6-dicarboxylic acid, diphenyldicarboxylic acid, diphenyl ether dicarboxylic acid, ethylene-1,2-bis(p-carboxyphenoxide), and p,p'-disulfonylbenzoic acid. The glycol component includes polymethylene glycols having 2 to 10 carbon atoms, cyclohexane dimethanol, p-xylylene diol, or benzene-1,4-bis($\beta$-oxyethoxide). Examples of the minor component of the polyester include isophthalic acid, phthalic acid, oxalic acid, adipic acid, sebacic acid, 6,6'-disulfonylcaproic acid, diethylene glycol, triethylene glycol, neopentyl glycol, and bisphenol A.

The novel feature of the polyester composition of the present invention having both improved dyeability and pilling resistance consists in the component of the general formula given above

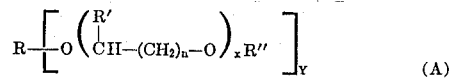 (A)

wherein R, R', R'', n x and Y are the same as defined above. Examples of the compound expressed by formula (A) (to be referred to simply as compound A) include those having the following structural formulae

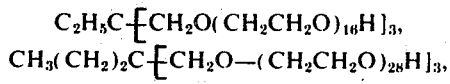

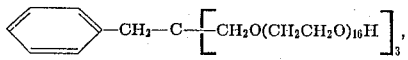

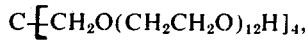

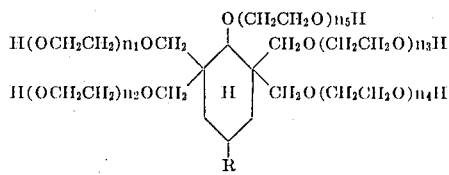

(where R is hydrogen or alkyl or not more than 15 carbon atoms; $n_1 - n_5$ is 8 on an average)

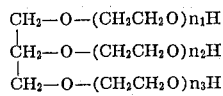

(where $n_1 - n_3$ is 12 on an average)

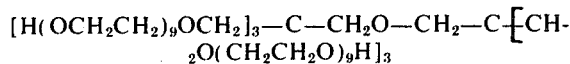

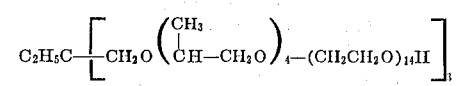

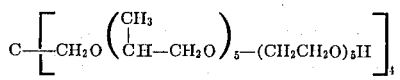

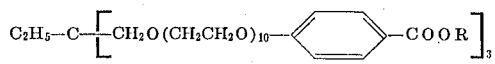

(where R is hydrogen or lower alkyl group.)

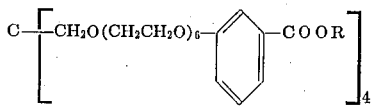

(where R is hydrogen or lower alkyl group and)

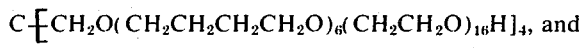, and

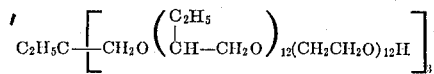

The polyester composition of the present invention may contain, together with the compound (A), a compound containing one esterified or non-esterified carboxyl or hydroxyl group per molecule (to be referred to as compound B for brevity's sake). Examples of the compound B include monocarboxylic acids such as caprylic acid, capric acid, lauric acid, myristic acid, palmitic acid, stearic acid, behenic acid, oleic acid, erucic acid, benzoic acid, alkylbenzenecarboxylic acids, phenylbenzoic acid, naphthalenecarboxylic acid, diphenylacetic acid, triethylbenzoic acid, alkoxybenzene carboxylic acid, hexahydrobenzoic acid, cyclohexylacetic acid, γ-cyclohexylbutyric acid, decalincarboxylic acid, phenylpropionic acid, diphenylsulfonemonocarboxylic acid, and phenoxybenzoic acid, dodecyl alcohol, cetyl alcohol, octadecyl alcohol, oleyl alcohol, phenyl ethyl alcohol, β-hydroxyethyl phenyl ether, β-hydroxyethyl naphthyl ether, β-hydroxyethyl naphthyl ether, δ-hydroxy butoxy phenyl ether, δ-hydroxy butoxy naphthyl ether, low molecular weight monohydric polyalkylene oxides or halogenated products or esterification products of these.

The improved polyester composition of the invention is synthesized by adding at least one compound A and/or B at any time during the polymerization reaction of the polyester components, and then completing the polymerization reaction. The polymerization can be performed in accordance with the known method using the reactants in the molten or solid state. The polymerization for producing polyesters may be performed in the presence or absence of a catalyst comprising a metal such as Zn, Co, Mn, Ca, Mg, Cd, Ti, Sn, Sb, or Ge or compound theory, a delusterant such as titanium dioxide, a discoloration inhibitor such as phosphoric acids or esters thereof, or a chain branching agent such as trimethylol propane, pentaerythritol, or benzenetricarboxylic acid. These compounds may be added in any stage before the completion of the polymerization, for example before or after ester-interchange, or before or during the polymerization reaction. This invention can be applied to the production of polyesters by direct-esterification or any other method.

The amount of compound A may vary depending upon the Y value in the foregoing general formula

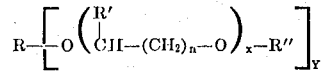

i.e., the number of the ester-forming polyalkylene ether groups

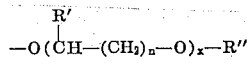

contained in one molecule of compound A. Generally, in order to give the same dyeability improving effect to a polyester, a compound A having a smaller value expressed by the product of $x$ and Y must be added in a larger amount than a compound A having a larger product of $x$ and Y. On the other hand, for imparting the same pilling resistance, a compound A having a smaller number (Y) of the ester-forming polyalkylene ether groups must be added in a larger amount than a compound A having a larger number of such groups. However, when a compound A having a large number of ester-forming polyalkylene ether groups is added in a large amount, the polyester tends to take a three dimensional structure, and therefore, the amount of the compound should be restricted within a certain range. The amount of compound A to be added is defined by W in mole percent based on the total acid component which constitutes the polyester $$Y/Y - 2 \geqq W \geqq Y/15 (Y - 2)$$

If the compound A is added in an amount in excess of this range, the polyester will take a three dimensional structure, or yarn breakage and poor drawing occur in the fiber-forming stage and cannot give fibers having desirable properties. If the amount is less than the lower limit of this range, the dyeability and pilling resistance of the polyester fiber cannot be fully obtained. The preferred amount of compound A is expressed by $W_p$ in mole percent based on the total acid component of the polyester $$2Y/5(Y-2) \geqq W_p \geqq (Y-1)/5(Y-2)$$

The amount of compound B is not more than Y times the amount of compound A but not below O mole percent. Polyesters could be prepared even if the amount exceeds Y times, but it is not desirable for improving the pilling resistance. The amount of compound B should be as small as possible. If the amount of compound A is small, the amount of compound B may be zero.

The optimum amount differs according to the types of compounds A and B and the properties of fibers made from the resulting polyester composition, and should be chosen according to the purposes desired.

In the present invention, the mere addition of compound A brings about excellent results. But if compound B is added conjointly, the rate of viscosity increase under the same polymerization conditions is slower than in the case of adding compound A alone. Therefore, when a large amount of compound A is added, it becomes easy to control the polymerization reaction. This constitutes a great advantage in obtaining a uniform reaction product. Furthermore, by the addition of compound B simultaneously, the amount of compound A can be increased so that it leads to marked improvement of the dyeability and pilling resistance of the polyester fiber.

In the production of the polyester composition of the present invention, compounds A and B may be added either separately or simultaneously, or as a solution in glycols or dicarboxylic acid esters, or simultaneously with the addition of a delustrant, pigment, dyestuff or stabilizer.

The polyester composition so obtained which contains compound A and/or compound B can be melt-spun into fibers by a customary method, and the resulting fibers have excellent dyeability and pilling resistance.

The polyester composition of the present invention is fabricated into fibrous materials having serviceable tenacity and other fiber properties that can be used in the usual spinning, weaving or knitting process. The fibers obtained are made into yarns, either alone or as blends with other fibers, by such means as spinning on a spinning frame, and then subjected to a weaving or knitting process. The fibers, yarns, knitted or woven goods so obtained possess excellent dyeability and pilling resistance. When these fibers and processed goods are subjected to rediation of light or heat-treated, their intrinsic viscosity $[\eta]$ decreases by at least 0.05 and there is also a decrease in tenacity and elongation and also in toughness, and therefore the pilling resistance can be further improved.

When radiation of light is applied, it is possible to expose the fibers to sunlight or subject them to radiation of a light source containing ultraviolet rays, and generally, this requires a long period of time. On the other hand, the heat-treatment is usually performed by using hot air at 100° to 200°C. A decrease in toughness is observed within a shorter time if the temperature is higher. Optimum treating conditions should be employed according to the form and properties of the final product.

A decrease in toughness of as much as 50 percent is sometimes observed to the fibrous material obtained by the process of the invention because of the heat-treatment after the formation of the fibers. The occurrence of pilling in woven or knitted fabrics obtained from the fibers of the invention is remarkably reduced after the heat-treatment.

According to the process of the present invention, the dyeability and pilling resistance of polyester synthetic fibers can be improved effectively, and this will contribute greatly to the development of polyester fibers.

The invention will further be described by the following Examples which do not in any way limit the scope of the invention. All parts in the Examples are by weight unless otherwise specified.

EXAMPLE 1

One hundred parts of dimethyl terephthalate and 80 parts of ethylene glycol were subjected to an ester-interchange reaction by a customary method using 0.04 part of zinc acetate as an ester-interchange catalyst. The ester-interchange reaction product was then subjecting to a polycondensation reaction using 0.05 part of trimethyl phosphate as a heat stabilizer and 0.05 part of antimony trioxide as a polycondensation catalyst, after adding 0.08 mole percent, based on the dimethyl terephthalate, of substance (I) of the formula $C_2H_5C[CH_2O(CH_2CH_2O)_xH]_3$ ($x$ is about 16; average molecular weight 2,000). A polyester having an $[\eta]$ of 0.594 was obtained.

The polyester was extruded in the molten state from a spinneret having 24 holes, each having a diameter of 0.25 mm, and wound up at a rate of about 400 meters/min. The filaments were drawn to 3.7 times the original length in a water bath at 80°C., and heat-treated without tension at 145°C. for 15 minutes. The resultant filaments had a tenacity of 2.48 g/d and an elongation of 28.4 percent. In the spinning process, the adhesion of the polymer to the spinneret face or the breakage of the filaments did not occur, and the spinning could be performed in good condition. The polymer had a good color, and there was substantially no undesirable discoloration. The drawing of the filaments could also be carried out in good condition without the occurrence of fuzzes or filament breakage.

The filaments so obtained were dyed under the following conditions. Dyestuff: Eastman Polyester Red B 2 percent by weight based on the filaments Dispersing agent: Scourol 400 (polyethylene glycol ether) 2 g/liter Goods-to-liquor ratio: 1:50
Temperature: 98°C. Time: 120 minutes
The filaments could be dyed a deep shade, and the amount of dye exhaustion was 18.8 mg/g. The pilling test of the filaments yielded good results.

COMPARATIVE EXAMPLE 1

Using the same polyester-forming materials as in Example 1 and 0.8 mole percent, based on the dimethyl terephthalate, of polyethylene glycol (average molecular weight 2,000) instead of substance (I), a polyester having an $[\eta]$ of about 0.56 was obtained by a polycondensation reaction under the same conditions as set forth in Example 1.

The polymer was extruded in the molten state through a spinneret having 24 holes, each having a diameter of 0.25 mm, and wound up at a rate of about 400 meters/min. The filaments were then drawn to 3.9 times the original length in a water bath at 80°C., and then heat-treated without tension at 145°C. for 15 minutes. The filaments obtained had a tenacity of 3.40 g/d and an elongation of 29.7 percent.

The filaments were dyed in a the same manner as in Example 1, in deep shade. The amount of dye exhaustion was 17.6 mg/g. Pilling test revealed that the filaments were better in pilling resistance than ordinary polyester fibers, but the occurrence of pills was still observed. The spinning could not be performed in good condition because the polymer frequently adhered to the spinneret face and there was frequent breakage of the filaments. The filament breakage and the occurrence of fuzzes were observed in the drawing step, and the drawability of the filaments was not good.

EXAMPLE 2

To the same polyester-forming materials as set forth in Example 1, 0.5 mole percent, based on the dimethyl terephthalate, of substance (I) was added, and a polyester having an $[\eta]$ of 0.562 was prepared by polycondensation reaction in a customary manner.

The polyester obtained was extruded in the molten state through a spinneret having 24 holes, each with a diameter of 0.25 mm, wound up at a rate of 400 meters/min., drawn to 4.0 times the original length in a water bath at 80°C., and heat treated without tension at 145°C. for 15 minutes. The resulting filaments had a tenacity of 2.94 g/d and an elongation of 28.0 percent.

There was no fluctuation in the intrinsic viscosity of the filaments during the spinning process. There was no discoloration of the polymer, and both the spinning and the drawing could be performed in good condition.

The filaments were dyed under the same conditions as set forth in Example 1, in deep shade. The amount of dye exhaustion was 16.5 mg/g. Pilling test indicated excellent resistance of the filaments to pilling.

EXAMPLE 3

To the same polyester-forming materials as set forth in Example 1, 0.03 mole percent, based on the dimethyl terephthalate, of substanace (I) was added, and a polyester having an $[\eta]$ of 0.509 was prepared by a polycondensation reaction in a customary manner.

The polyester obtained was extruded in the molten state through a spinneret having 24 holes each with a diameter of 0.25 mm, wound up at a rate of 400 meters/min., drawn to 4.3 times the original length in a water bath at 80°C., and heat-treated at 145°C. for 15 minutes under zero tension. The filaments obtained had a tenacity of 2.54 g/d and an elongation of 32.1 percent. The polymer was not colored, and the color of the polymer was good. There was no fluctuation in the intrinsic viscosity of the filaments during the spinning process, and both the spinning and drawing could be performed in good condition.

The filaments were dyed under the same conditions as set forth in Example 1, in a deep shade. The amount of dye exhaustion was 13.3 mg/g. Pilling test indicated that the filaments had good resistance to pilling.

EXAMPLE 4

To the same polyester-forming materials as set forth in Example 1 0.8 mole percent, based on the dimethyl terephthalate, of substance (II) of the formula $C_2H_5C\mathrm{-}[CH_2O(CH_2CH_2O)_xH]_3$ (x is about 8, average molecular weight 1,100) was added instead of substance (I), and a polyester having an $[\eta]$ of 0.622 was prepared by a polycondensation reaction in a customary manner.

The polyester was extruded in the molten state through a spinneret having 24 holes each with a diameter of 0.25 mm, wound up at a rate of 400 meters/min., drawn to 3.2 times the original length in a water bath at 80°C., and heat-treated without tension at 145°C. for 15 minutes. The filaments had a tenacity of 2.38 g/d and an elongation of 27.1 percent. The polycondensation reaction, spinning and drawing could be performed in good condition without any trouble.

The filaments were dyed under the same conditions as set forth in Example 1, in a deep shade. The amount of dye exhaustion was 14.6 mg/g. Pilling test indicated that the filaments had excellent resistance to pilling.

EXAMPLE 5

To the same polyester-forming materials as set forth in Example 1 0.6 mole percent, based on the dimethyl terephthalate, of substance (II) was added, and a polyester having an $[\eta]$ of 0.596 was prepared by a polycondensation reaction in a customary manner.

The polyester was extruded in the molten state through a spinneret having 24 holes, each with a diameter of 0.25 mm, wound up at a rate of 400 meters/min., drawn to 3.6 times the original length in a water bath at 80°C., and heat-treated without tension at 145°C. for 15 minutes. The resulting filaments had a tenacity of 2.50 g/d and an elongation of 31.1 percent. The whole production process could be performed in good condition, and both the spinning and drawing could be performed in good condition.

The filamants were dyed under the same conditions as set forth in Example 1, in a deep shade. The amount of dye exhaustion was 14.5 mg/g. Pilling test indicated that the filaments had excellent resistance to pilling.

EXAMPLE 6

To the same polyester-forming materials as set forth in Example 1 0.4 mole percent, based on the dimethyl terephthalate, of substance (II) was added, and a polyester having an $[\eta]$ of 0.455 was prepared by a polycondensation reaction in a customary manner.

The polyester was extruded in the molten state through a spinneret having 24 holes, each with a diameter of 0.25 mm, wound up at a rate of 400 meters/min., drawn to 4.2 times the original length in a water bath at 80°C., and then heat-treated under zero tension at 145°C. for 15 minutes. The filaments obtained had a tenacity of 2.31 g/d and an elongation of 35.8 percent. The overall process could be operated in good condition, and the color of the polymer was good. There was no trouble in the spinning and drawing steps.

The filaments were dyed under the same conditions as set forth in Example 1, in deep shade. The amount of dye exhaustion was 13.6 mg/g. The pilling test yielded good results.

EXAMPLES 7 TO 9

To the same polyester-forming materials as set forth in Example 1 substance (III) of the formula $C_2H_5C\mathrm{-}[CH_2O(CH_2CH_2O)_xH]_3$ (x is about 4, average molecular weight 600) was added in the amount indicated in Table 1, and the polycondensation reaction was performed. The results obtained are given in Table 1.

Table 1

|  | Example 7 | Example 8 | Example 9 |
|---|---|---|---|
| Amount of substance (III) based on DMT | 1.0 | 0.8 | 0.6 |
| $[\eta]$ of polyester at 30°C. | 0.720 | 0.655 | 0.548 |
| Draw ratio | 2.9 | 3.3 | 3.8 |
| Tenacity (g/d) | 1.82 | 2.05 | 2.47 |
| Elongation (%) | 34.3 | 32.0 | 28.1 |
| Dye exhaustion (mg/g) | 15.7 | 13.9 | 13.0 |
| Degree of discoloration of the polyester | small | small | small |
| Spinnability | good | good | good |
| Drawability | good | good | good |
| Pilling resistance | good | good | good |

EXAMPLE 10

To the same polyester-forming materials 0.2 mole percent, based on the dimethyl terephthalate, of substance (IV) of the formula $C[CH_2O(CH_2CH_2O)_xH]_4$ ($x$ is 12 on an average, average molecular weight 2,200) was added, and a polyester having an $[\eta]$ of 0.477 was prepared by a polycondensation reaction in a customary manner.

The polyester was extruded in the molten state through a spinneret having 24 holes, each with a diameter of 0.25, wound up at a rate of 400 meters/min., drawn to 5.0 times the original length in a water bath at 80°C., and heat-treated without tension at 145°C. for 15 minutes. The resulting filaments had a tenacity of 2.88 g/d and an elongation of 31.3 percent. The overall process was performed without any trouble. The filament breakage and the adhesion of the polymer to the spinneret face at the time of spinning did not occur, and the filament breakage and the occurrence of fuzzes were not observed.

The filaments were dyed under the same conditions as set forth in Example 1, in a deep shade. The amount of dye exhaustion was 14.1 mg/g. The pilling test yielded good results.

EXAMPLE 11

To the same polyester-forming materials as set forth in Example 1 0.25 mole percent, based on the dimethyl terephthalate, of substance (V) of the formula $C(CH_2O(CH_2CH_2O)_xH)_4$ ($x$ is about 8, average molecular weight 1,500) was added, and a polyester having an $[\eta]$ of 0.556 was prepared by a polycondensation reaction in a customary manner.

The polyester was extruded in the molten state through a spinneret having 24 holes, each with a diameter of 0.25 mm. The filaments were wound up at a rate of 400 meters/min., drawn to 4.2 times the original length in a water bath at 80°C., and heat-treated under zero tension at 145°C. for 15 minutes. The resulting filaments had a tenacity of 3.06 g/d and an elongation of 28.1 percent. The overall productional process could be performed in good condition, and there was no trouble in the spinning and drawing steps.

The filaments were dyed under the same conditions as set forth in Example 1, in deep shade. The amount of dye exhaustion was 14.5 mg/g. Pilling test revealed that the filaments had excellent resistance to pilling.

EXAMPLE 12

To the same polyester-forming materials as set forth in Example 1 0.3 mole percent, based on the dimethyl terephthalate, of substance (VI) of the formula $C[CH_2O(CH_2CH_2O)_xH]_4$ ($x$ is about 4, average molecular weight 840) was added, and a polyester having an $[\eta]$ of 0.483 was prepared by a polycondensation reaction in a customary manner.

The polyester was extruded in the moten state through a spinneret having 24 holes, each with a diameter of 0.25 mm. The filaments were wound up at a rate of 400 meters/min., drawn to 4.7 times the original length in a water bath at 80°C., and heat-treated under no tension at 145°C. for 15 minutes. The resulting filaments had a tenacity of 2.33 g/d and an elongation of 30.5 percent. The overall productional process could be performed in good condition, and both the spinning and drawing steps could be operated in good condition.

The filaments were dyed under the same conditions as set forth in Example 1, in a deep shade. The amount of dye exhaustion was 13.3 mg/g. Pilling test revealed that the filaments had excellent resistance to pilling.

EXAMPLES 13 TO 15

To the same polyester-forming materials as set forth in Example 1 each of the substances indicated in Table 2 was added in the amounts indicated, and a polycondensation reaction was performed. The polymer was melt spun, and then dyed under the same conditions as set forth in Example 1. The results are given in Table 2.

Table 2

|  | Example 13 | Example 14 | Example 15 |
|---|---|---|---|
| Compound A added | substance (IV) | substance (V) | substance (VI) |
| Amount of compound A (mole %/DMT) | 0.5 | 0.6 | 0.8 |
| $[\eta]$ of the polyester at 30°C. | 0.425 | 0.438 | 0.405 |
| Draw ratio | 3.2 | 3.0 | 3.0 |
| Tenacity (g/d) | 2.66 | 2.54 | 2.19 |
| Elongation (%) | 27.5 | 28.1 | 23.7 |
| Dye exhaustion (mg/g) | 17.2 | 16.8 | 15.1 |
| Discoloration of the polyester | small | small | small |
| Spinnability | good | good | good |
| Drawability | good | good | good |
| Pilling resistance | good | good | good |

EXAMPLE 16

To the same polyester-forming materials as set forth in Example 1 0.4 mole percent, based on the dimethyl terephthalate of

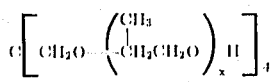

($x$ is about 6, average molecular weight 1,500) was added, and a polyester having an [$\eta$] of 0.547 was prepared by polycondensation reaction in a customary manner.

The polyester was extruded in the molten state through a spinneret having 24 holes, each with a diameter of 0.25 mm, wound up a rate of 400 meters/min., drawn to 3.8 times the original length in a water bath at 80°C., and then heat-treated under no tension at 145°C. for 15 minutes. The resulting filaments had a tenacity of 2.63 g/d and an elongation of 24.5 percent. The overall production process could be performed in good condition, and there was no trouble both in the spinning and drawing steps.

The filaments were dyed under the same conditions as set forth in Example 1. The amount of dye exhaustion was 13.6 mg/g, and the filaments could be dyed in a deep shade. Pilling test revealed that the filaments had excellent resistance to pilling.

EXAMPLE 17

To the same polyester-forming materials as set forth in Example 1 0.7 mole percent, based on the dimethyl terephthalate, of a compound of the formula $C[CH_2O(CH_2CH_2CH_2CH_2O)_xH]_4$ ($x$ is about 2, the average molecular weight 750) was added, and a polyester having an [$\eta$] of 0.428 was prepared by a polycondensation reaction in a customary manner.

The polyester was extruded in the molten state through a spinneret having 24 holes each with a diameter of 0.25, wound up at a rate of 400 meters/min., drawn to 3.0 times the original length in a water bath at 80°C., and heat-treated under zero tension at 145°C. for 15 minutes. The resulting filaments had a tenacity of 2.09 g/d and an elongation of 30.1 percent. The color of the polyester was good, and the spinning and drawing steps could be operated in good condition.

The filaments were dyed under the same conditions as set forth in Example 1, in a deep shade. The amount of dye exhaustion was 14.5 mg/g. Pilling test revealed that the filaments had excellent resistance to pilling.

EXAMPLE 18

To the same polyester-forming materials as set forth in Example 1 0.5 mole percent, based on the dimethyl terephthalate, of a compound of the formula $CH_3(CH_2)_2$

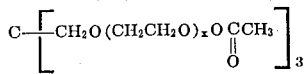

($x$ is about 12, average molecular weight 1,800) was added, and a polyester having an [$\eta$] of 0.490 was prepared by a polycondensation reaction in a customary manner.

The polyester was extruded in the molten state through a spinneret having 24 holes, each with a diameter of 0.25 mm. The filaments were wound up at a rate of 400 meters/min., drawn to 5.2 times the original length in a water bath at 80°C., and heat treated under zero tension at 145°C. for 15 minutes. The resulting filaments had a tenacity of 2.62 g/d and an elongation of 28.1 percent. The polymer was not discolored, and there was no fluctuation of the intrinsic viscosity of the polymer during the production process. Both the spinning and drawing could be carried out in good condition.

The filaments were dyed under the same conditions as set forth in Example 1, in a deep shade. The amount of dye exhaustion was 16.2 mg/g. Pilling test revealed that the filaments had excellent resistance to pilling.

EXAMPLE 19

To the same polyester-forming materials as set forth in Example 1 1.5 mole percent of substance (VII) of the formula $C[CH_2O-(CH_2CH_2O)_xH]_4$ ($x$ is about 4, average molecular weight 840) and 4.0 mole percent of diphenylacetic acid was added, the amounts of both additives being based on the dimethyl terephthalate, and a polyester having an [$\eta$] of 0.460 in chip form was prepared by polycondensation reaction in a customary manner.

The polyester chips were dried at about 180°C. in a dryer, and then extruded through a spinneret having 24 holes, each with diameter of 0.25 mm at an extrusion temperature of 290°C., and wound up at a rate of 400 meters/min. The filaments were drawn to 3.4 times the original length in a water bath at 80°C. and heat-treated under zero tension at 145°C. for 15 minutes. The resulting filaments had a tenacity of 2.50 g/d and an elongation of 27.4 percent. The control of the polycondensation reaction could be performed easily, and there was substantially no fluctuation in the intrinsic viscosity of the polymer during the productional process. Changes in intrinsic viscosity at the time of drying the dhips and spinning were too small to affect the quality of the final product. The spinning and drawing steps could be performed in good condition without the occurrence of filament breakage or fuzzes.

The filaments were dyed under the same conditions as in Example 1, in deep red. The amount of dye exhaustion was 18.2 mg/g. Pilling test revealed that the filaments had excellent resistance to pilling.

COMPARATIVE EXAMPLE 2

To the same polyester-forming materials as set forth in Example 1 1.5 mole percent, based on the dimethyl terephthalate, of substance (VIII) was added, and a polyester having an [$\eta$] of 0.41 in chip form was prepared by a polycondensation reaction in a customary manner.

The polyester chips were dried in a dryer at about 180°C., and spun through a spinneret having 24 holes, each with a diameter of 0.25 mm at 290°C. The filaments were wound up at a rate of 400 meters/min., drawn to 2.8 times the original length in a water bath at 80°C., and then heat-treated under zero tension at 145°C. for 15 minutes. The resulting filaments had a tenacity of 1.91 g/d and an elongation of 30.5 percent.

Since compound B was not present in this Example, it was slightly more difficult to obtain a polymer of uniform [$\eta$] by controlling the polycondensation reaction than in the polymerization process in Example 19. The intrinsic viscosity fluctuated at the time of drying the polymer chips, and the resulting polymer chips had a somewhat different viscosity [η] from that desired. It was probably due to this that the filament breakage occurred to some extent both in the spinning and the drawing steps, with the consequent non-uniformity in the drawability of the filaments.

When the filaments were dyed in the same way as set forth in Example 1, unevenness occurred in dyeing.

EXAMPLE 20

To the same polyester-forming materials as set forth in Example 1 1.6 mole percent of substance (VIII) of the formula $C_2H_5C-[CH_2O-(CH_2CH_2O)_xH]_3$ (x is about 12, average molecular weight 1,800) and 4.5 mole percent of caprylic acid were added, the amounts of both components being based on the dimethyl terephthalate, and a polyester having an [η] of 0.530 in chip form was prepared by a polycondensation reaction in a customary manner.

The polymer chips were dried at about 180°C., and extruded through a spinneret having 24 holes, each with a diameter of 0.25 mm. The filaments were drawn to 3.3 times the original length in a water bath at 80°C. and heat-treated under zero tension at 145°C. for 15 minutes. The filaments obtained had a tenacity of 2.30 g/d and an elongation of 29.2 percent. In the production process, the control of the polycondensation reaction was easy, and there was no fluctuation in the intrinsic viscosity of the polymer during the drying of the polymer chips and their spinning. Both the spinning and drawing could be performed in good condition without involving filament breakage and the occurrence of fuzzes.

The filaments were dyed under the same conditions as set forth in Example 1, in deep red. The amount of dye exhaustion was 18.8 mg/g. Pilling test indicated that the filaments had excellent resistance to pilling.

COMPARATIVE EXAMPLE 3

To the same polyester-forming materials as set forth in Example 1 1.6 mole percent, based on the dimethyl terephthalate, of substance (VIII) was added, and a polyester having an [η] of 0.52 in chip form was prepared by a polycondensation reaction in a customary manner.

The polyester chips were dried in a dryer at about 180°C. and then spun at 290°C. through a spinneret having 24 holes, each with a diameter of 0.25 mm. The filaments were wound up at a rate of 400 meters/min., drawn to 2.5 times the original length in a water bath at 80°C., and heat-treated without tension at 145°C. for 15 minutes. The resulting filaments had a tenacity of 1.97 g/d and an elongation of 31.3 percent. At this time, it was somewhat difficult to obtain a polymer of uniform [η] by controlling the polycondensation reaction.

Furthermore, there was fluctuation in the intrinsic viscosity of the polymer at the time of drying the polymer chips, and it was probably due to this that the polymer adhered to the spinneret face at the time of spinning. The filament breakage and the occurrence of fuzzes were observed at the time of drawing.

EXAMPLE 21

To the same polyester-forming materials as set forth in Example 1 0.6 mole percent of a compound of the formula

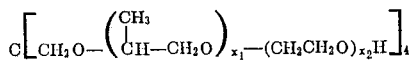

($x_1$ is about 3, $x_2$ is about 3, average molecular weight 1,400) and 1.5 mole percent of stearic acid were added, the amounts of both additives being based on the dimethyl terephthalate, and a polyester having an [η] of 0.450 was prepared by a polycondensation reaction in a customary manner.

The polyester chips were dried at about 180°C., and extruded at 290°C. through a spinneret having 24 holes, each with a diameter of 0.25 mm. The filaments were wound up at a rate of 400 meters/min., drawn to 3.3 times the original length in a water bath at 80°C., and heat-treated under zero tension at 145°C. for 15 minutes. The resulting filaments had a tenacity of 2.22 g/d and an elongation of 23.5 percent. The polycondensation reaction could be controlled easily. There was no fluctuation in the intrinsic viscosity of the polymer at the time of drying the chips and the spinning, and both the spinning adn drawing could be performed in good condition without filament breakage.

The filaments were dyed under the same conditions as set forth in Example 1, in a deep shade. The amount of dye exhaustion was 16.8 mg/g. Pilling test revealed that the filaments had excellent resistance to pilling.

EXAMPLE 22

To the same polyester-forming materials as set forth in Example 1 1.6 mole percent of a compound of the formula

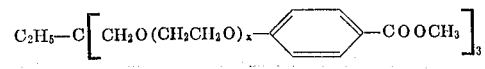

(x is about 8, average molecular weight 1,600) and 2.0 mole percent of cetyl alcohol were added, the amounts of both compounds being based on the dimethyl terephthalate, and a polyester having an [η] of 0.485 in chip form was prepared by precondensation in a customary manner.

The polyester chips were dried at about 180°C., and then extruded at 290°C. through a spinneret having 24 holes, each with a diameter of 0.25 mm. The filaments were wound up at a rate of 400 meters/min., drawn to 3.2 times the original length in a water bath at 80°C., and heat-treated under zero tension at 145°C. for 15 minutes. The resulting filaments had a tenacity of 2.36 g/d and an elongation of 19.6 percent. The control of the polycondensation was easy, and a polymer having a uniform [η] could be obtained. There was no fluctuation in [η] at the time of drying the chips and spinning. Both the spinning and drawing could be performed in good condition without the occurrence of filament breakage or fuzzes.

The filaments were dyed under the same conditions as in Example 1, in a deep shade. The amount of dye exhaustion was 19.5 mg/g. Pilling test revealed that the filaments had excellent resistance to pilling.

EXAMPLE 23

To the same polyester-forming materials as set forth in Example 1 1.5 mole percent of

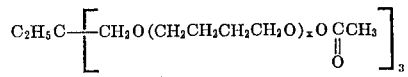

(x is about 12, average molecular weight 2,400) and 2.0 mole percent of $C_9H_{19}O(CH_2CH_2O)_yH$ (y is about 4, average molecular weight 300) were added, and a polyester having an [η] of 0.427 in chip form was prepared by a polycondensation in a customary manner.

The polyester chips were dried at about 180°C., and extruded at 290°C. through a spinneret having 24 holes, each with a diameter of 0.25 mm. The filaments were wound up at a rate of 400 meters/min., drawn to 2.8 times the original length in a water bath at 80°C., and heat-treated under zero tension at 145°C. for 15 minutes. The resulting filaments had a tenacity of 1.63 g/d and an elongation of 24.8 percent.

The filaments were dyed under the same conditions as set forth in Example 1, in deep red. The amount of dye exhaustion was 19.3 mg/g. Pilling test revealed that the filaments had excellent resistance to pilling.

EXAMPLE 24

To the same polyester-forming materials as set forth in Example 1 2.0 mole percent of $C_2H_5$—$CH_2$—$C+CH_2O(CH_2CH_2O)_xH]_3$ ($x$ is about 8, average molecular weight 1,150) and 4.0 mole percent of benzoic acid were added, the amounts of both compounds being based on dimethyl terephthalate, and a polyester having an $[\eta]$ of 0.625 was prepared by a polycondensation reaction in a customary manner.

The polyester was extruded in the molten state through a spinneret having 24 holes, each with a diameter of 0.25 mm, wound up at a rate of about 400 meters/min., drawn to 2.2 times the original length in a water bath at 80°C., and then heat-treated under zero tension at 145°C. for 15 minutes. The resulting filaments had a tenacity of 2.54 g/d and an elongation of 18.5 percent. The polycondensation reaction could be controlled easily, and there was no fluctuation in the intrinsic viscosity of the filaments during spinning. Both the spinning and drawing steps could be performed in good condition without the occurrence of filament breakage or fuzzes.

The filaments were dyed under the same conditions as set forth in Example 1, in deep red. The amount of dye exhaustion was 18.2 mg/g. Pilling test revealed that the filaments had excellent resistance to pilling.

EXAMPLE 25

To the same polyester-forming materials as set forth in Example 1 0.8 mole percent of

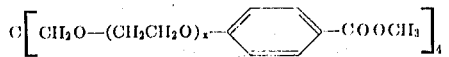

($x$ is about 6, average molecular weight 1,300) and 1.5 mole % of $CH_3O(CH_2CH_2O)_4H$ were added, the amounts of both compounds being based on dimethyl terephthalate, and a polyester having an $[\eta]$ of 0.511 was prepared by a polycondensation reaction in a customary manner.

The polyester was extruded in a molten state through a spinneret having 24 holes, each with a diameter of 0.25 mm, wound up at a rate of about 400 meters/min., drawn to 3.0 times the original length in a water bath at 80°C., and then heat-treated under zero tension at 145°C. for 15 minutes. The resulting filaments had a tenacity of 1.88 g/d and an elongation of 26.5 percent. The polycondensation reaction could be controlled easily. Both the spinning and drawing steps could be performed in good condition without any trouble.

The filaments were dyed under the same conditions as set forth in Example 1, in deep red. The amount of dye exhaustion was 16.8 mg/g. Pilling test refealed that the filaments had excellent resistance to pilling.

EXAMPLE 26

To the same polyester-forming materials as set forth in Example 1 0.2 mole % of substance (VIII) and 0.5 mol % of cyclohexylacetic acid substance (IX) of the formula

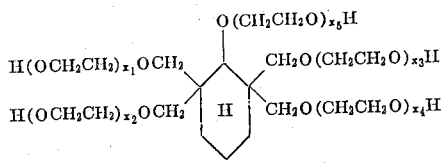

($x_1, x_2, x_3, x_4$ and $x_5$ are 8 on an average, average molecular weight 2,000) were added the amounts of both compounds being based on dimethyl terephthalate, and a polyester having an $[\eta]$ of 0.540 was prepared by polycondensation reaction in a customary manner.

The polyester was extruded in a molten state through a spinneret having 24 holes, each with a diameter of 0.25 mm, wound up at a rate of about 400 meters/min., drawn to 3.2 times the original length in a water bath at 80°C., and then heat-treated under zero tension at 145°C. for 15 minutes. The resulting filaments had a tenacity of 2.38 g/d and an elongation of 28.8 percent. The polycondensation reaction could be controlled easily. Both the spinning and drawing steps could be performed in good condition.

The filaments were dyed under the same conditions as set forth in Example 1, in deep red. The amount of dye exhaustion was 15.2 mg/g. Pilling test revealed that the filaments had excellent resistance to pilling.

EXAMPLE 27

To the same polyester-forming materials as set forth in Example 1 0.2 mole percent of substance (X) of the formula

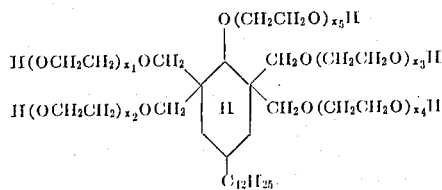

($x_1, x_2, x_3, x_4$ and $x_5$ are 8 on an average, average molecular weight 2,200) and 0.5 mole percent of methyl benzoate were added, the amounts of both compounds being based on dimethyl terephthalate, and a polyester having an $[\eta]$ of 0.486 was prepared by a polycondensation reaction in a customary manner.

The polyester was extruded in a molten state through a spinneret having 24 holes, each with a diameter of 0.25 mm, wound up at a rate of about 400 meters/min., drawn to 3.5 times the original length in a water bath at 80°C., and then heat-treated under zero tension at 145°C. for 15 minutes. The resulting filaments had a tenacity of 2.3 g/d and an elongation of 27.5 percent. The polycondensation reaction could be controlled easily. Both the spinning and drawing steps could be performed in good condition without any trouble.

The filaments were dyed under the same conditions as set forth in Example 1, in deep red. The amount of dye exhaustion was 14.8 mg/g. Pilling test revealed that the filaments had excellent resistance to pilling.

EXAMPLE 28

To the same polyester-forming materials as set forth in Example 1 0.8 mole % of substance (XI) of the formula

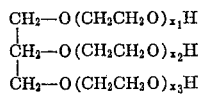

($x_1$, $x_2$ and $x_3$ are 12 on an average, average molecular weight 1,700) and 0.5 mole percent of stearic acid were added, the amounts of both compounds being based on dimethyl terephthalate, and a polyester having an [$\eta$] of 0.55 was prepared by a polycondensation reaction in a customary manner.

The polyester was extruded in a molten state through a spinneret having 24 holes, each with a diameter of 0.25 mm, wound up at a rate of about 400 meters/min., drawn to 3.2 times the original length in a water bath at 80°C., and then heat-treated under zero tension at 145°C. for 15 minutes. The resulting filaments had a tenacity of 2.4 g/d and an elongation of 29.2 percent. The polycondensation reaction could be controlled easily. Both the spinning and drawing steps could be performed in good condition without any trouble.

The filaments were dyed under the same conditions as set forth in Example 1, in deep red. The amount of dye exhaustion was 18.2 mg/g. Pilling test revealed that the filaments had excellent resistance to pilling.

EXAMPLE 29

To the same polyester-forming materials as set forth in Example 1 0.15 mole percent of substance (XII) of the formula [H(OCH$_2$CH$_2$)$_x$ OCH$_2$]$_3$C—CH$_2$OCH$_2$C-[CH$_2$O(CH$_2$CH$_2$O)$_x$ H]$_3$ ($x_1$ and $x_2$ are 9 on an average, average molecular weight 2,600) and 0.5 mole percent of methyl benzoate were added, the amounts of both compounds being based on dimethyl terephthalate, and a polyester having an [$\eta$] of 0.53 was prepared by a polycondensation reaction in a customary manner.

The polyester was extruded in a molten state through a spinneret having 24 holes each with a diameter of 0.25 mm, wound up at a rate of about 400 meters/min., drawn to 2.9 times the original length in a water bath at 80°C., and then heat-treated under zero tension at 145°C. for 15 minutes. The resulting filaments had a tenacity of 2.05 g/d and an elongation of 27.5 percent. The polycondensation reaction could be controlled easily. Both the spinning and drawing steps could be performed in good condition without any trouble.

The filaments were dyed under the same conditions as set forth in Example 1, in deep red. The amount of dye exhaustion was 16.6 mg/g. Pilling test revealed that the filaments had excellent resistance to pilling.

EXAMPLE 30

To the same polyester-forming materials as set forth in Example 1 0.4 mole percent of substance (XIII) of the formula

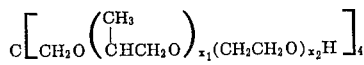

($x_1$ and $x_2$ are about 6, average molecular weight 2,500) and 0.5 mole % of stearic acid were added, the amounts of both compounds being based on dimethyl terephthalate, and a polyester having an [$\eta$] of 0.56 was prepared by a polycondensation reaction in a customary manner.

The polyester was extruded in a molten state through a spinneret having 24 holes, each with a diameter of 0.25 mm, wound up at a rate of about 400 meters/min., drawn to 3.6 times the original length in a water bath at 80°C., and then heat-treated under zero tension at 145°C. for 15 minutes. The resulting filaments had a tenacity of 2.2 g/d and an elongation of 28.3 percent. The polycondensation reaction could be controlled easily. Both the spinning and drawing steps could be performed in good condition without any trouble.

The filaments were dyed under the same conditions as set forth in Example 1, in deep red. The amount of dye exhaustion was 15.3 mg/g. Pilling test revealed that the filaments had excellent resistance to pilling.

EXAMPLE 31

To the same polyester-forming materials as set forth in Example 1 2.0 mole percent of substance (XIV) (hydroxyl-terminated compound obtained by adding each 6 moles of propylene oxide and ethylene oxide to all the hydroxyl groups of pentaerythritol at a ratio of 1:1) and 0.5 mole percent of methyl benzoate were added, the amounts of both compounds being based on dimethyl terephthalate, and a polyester having an [$\eta$] of 0.50 was prepared by a polycondensation reaction in a customary manner.

The polyester was extruded in a molten state through a spinneret having 24 holes, each with a diameter of 0.25 mm, wound up at a rate of about 400 meters/min., drawn to 3.3 times the original length in a water bath at 80°C., and then heat-treated under zero tension of 2.1 g/d and an elongation of 24.4 percent. The polycondensation reaction could be controlled easily. Both the spinning and drawing steps could be performed in good condition without any trouble.

The filaments were dyed under the same conditions as set forth in Example 1, in deep red. The amount of dye exhaustion was 17.7 mg/g. Pilling test revealed that the filaments had excellent resistance to pilling.

EXAMPLE 32

Ester-interchange reaction was performed in a customary manner between 100 parts of dimethyl terephthalate and 80 parts of ethylene glycol using 0.04 part of zinc acetate as an ester interchange catalyst. Polyester-forming materials were prepared by adding to the ester-interchange reaction product 0.05 part of trimethyl phosphate as a heat stabilizer and 0.04 part of antimony trioxide as a polycondensation catalyst. To the polyester-forming materials 0.4 mole percent of substance (VI) and 0.6 mole percent of substance (XV) of the formula C$_9$H$_{19}$O—(CH$_2$CH$_2$O)$_x$H ($x$ is about 4, average molecular weight 320) were added, and a polyester having an [$\eta$] of 0.55 was prepared by a polycondensation reaction in a customary manner.

The polyester was extruded through a spinneret having 24 holes, each with a diameter of 0.25 mm, wound up at a rate of about 400 meters/min., drawn to 3.5 times the original length in a water bath at about 80°C., and heat-treated under zero tension at 145°C. for 15 minutes. The resulting filaments had a tenacity of 3.20 g/d and 34.5 percent.

A knitted article was produced by a knitting machine using the resulting filaments. The knitting could be performed in good condition without involving yarn breakage the occurrence of fuzzes.

The knitted article was heat-treated at a constant length at 180°C. for one hour. The intrinsic viscosity [$\eta$] was reduced to 0.38, the tenacity to 1.95 g/d, and elongation to 22.2 percent. Pilling test revealed that the knitted article had excellent resistance to pilling.

The knitted article was dyed under the same conditions as set forth in Example 1. It was possible to dye it in a deep shade, and the amount of dye exhaustion was 17.7 mg/g.

The polycondensation reaction could be controlled easily, and there was no fluctuation in [η]. It was easy to obtain the desired [η]. Both the spinning and drawing steps could be performed under good condition without the filament breakage or the occurrence of fuzzes.

COMPARATIVE EXAMPLE 4

A polyester having an [η] of 0.55 in chip form was prepared by polycondensing the same polyester-forming materials as set forth in Example 32 in a customary manner without adding substances (VI) and (XV).

The polyester chips were extruded in the molten state from a spinneret having 24 holes, each with a diameter of 0.25 mm, wound up at a rate of 400 meters/min., drawn to 5.2 times the original length, and heat-treated at 145°C. for 15 minutes. The filaments had a tenacity of 4.62 g/d and an elongation of 45.8 percent.

A knitted article was produced by a knitting machine using the filaments obtained. The knitted article was heat-treated at 180°C. for one hour at a constant length. The intrinsic viscosity of the polyester was reduced to 0.53. Pilling test indicated that there was substantial occurrence of pills, and the pilling resistance of the knitted article was not good.

The knitted article was dyed under the same conditions as set forth in Example 1, but was colored in a light shade. The amount of dye exhaustion was as small as about 7.0 mg/g.

COMPARATIVE EXAMPLE 5

A polyester having an [η] of 0.53 in chip form was prepared by polycondensing the same polyester-forming materials as set forth in Example 52 in a customary manner using 0.4 mol percent of pentaerythritol and 0.6 mol percent of substance (XV).

The polyester chips were extruded in a molten state from a spinneret having 24 holes, each with a diameter of 0.25 mm, wound up at a rate of 400 meters/min., drawn to 2.8 times the original length, and heat-treated at 145°C. for 15 minutes. The filaments had a tenacity of 2.56 g/d and an elongation of 28.8 percent.

A knitted article was produced by a knitting machine using the filaments obtained. Pilling test indicated better pilling resistance than ordinary polyester fibers, but it was still insufficient.

There was frequent filament breakage in the production of the knitted article, and there was substantial occurrence of fuzzes. Its pilling resistance was not improved even when it was heat-treated for 1 hour at 180°C.

EXAMPLE 33

To the same polyester-forming materials as used in Example 32 0.6 mole percent of substance II and 0.3 mole percent of substance (XVI) of the formula

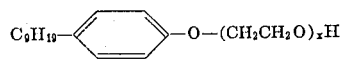

(x is about 4, average molecular weight 400) were added, the amounts of both compounds being based on the dimethyl terephthalate, and a polyester having an [η] of 0.60 was prepared by a polycondensation reaction in a customary manner.

The polyester was extruded in the molten state through a spinneret having 24 holes, each with a diameter of 0.25 mm, wound up at a rate of about 400 meters/min., drawn to 3.6 times the original length in a water bath at about 80°C., and then heat-treated under zero tension at 145°C. for 15 minutes. The resulting filaments had a tenacity of 3.51 g/d and an elongation of 44.2 percent.

A knitted article was produced by a knitting machine using the resulting filaments, and then heat-treated at a constant length at 180°C. for one hour. The intrinsic viscosity of the polyester at this time was reduced to 0.42. Pilling test indicated that the knitted article had excellent resistance to pilling.

The knitted article was dyed under the same conditions as set forth in Example 1, and could be colored in a deep shade.

EXAMPLE 34

To the same polyester-forming materials as used in Example 32 0.3 mole percent of substance (XVII) of the formula

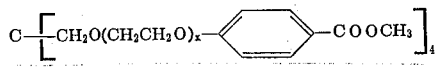

(x is about 4, average molecular weight 1,300) and 0.3 mole percent of methoxypolyethylene glycol (average molecular weight 250) were added, the amounts of both compounds being based on the dimethyl terephthalate, and a polyester having an [η] of 0.70 was prepared by a polycondensation reaction in a customary manner.

The polyester was extruded in a molten state through a spinneret having 24 holes, each with a diameter of 0.25 mm, wound up at a rate of about 400 meters/min., drawn to 3.2 times the original length in a water bath at about 80°C., and then heat-treated under zero tension at 145°C. for 15 minutes. The resulting filaments had a tenacity of 3.28 g/d and an elongation of 33.5 percent.

A knitted article was produced by a knitting machine using the resulting filaments, and then heat-treated at a constant length at 180°C. for 1 hour. The intrinsic viscosity of polyester at this time was reduced to 0.38. Pilling test indicated that the knitted article had excellent resistance to pilling.

The knitted article was dyed under the same conditions as set forth in Example 1, and could be colored in a deep shade and without dyeing uneveness.

In the production process, there was no fluctuation in the intrinsic viscosity of the polymer, and the polycondensation reaction could be controlled easily. Both the spinning and drawing steps could be performed in good condition without involving filament breakage or occurrence of fuzzes. In the knitting step, too, the operation could be performed in good condition without any trouble such as filament breakage.

EXAMPLE 35

To the same polyester-forming materials as used in Example 32 0.5 mole percent of

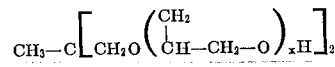

(x is about 12) and 0.2 mole percent of methyl benzoate were added the amounts of both compounds being based on the dimethyl terephthalate and a polyester having an [η] of 0.52 was prepared by a polycondensation reaction in a customary manner.

The polyester was extruded in a molten state through a spinneret having 24 holes, each with a diameter of 0.25 mm, wound up at a rate of about 400 meters/min., drawn to 4.2 times the original length in a water bath at about 80°C., and then heat-treated under zero tension at 145°C. for 15 minutes. The resulting filaments had a tenacity of 4.25 g/d and an elongation of 35.5 percent.

A knitted article was produced by a knitting machine using the resulting filaments, and then heat-treated at a constant length at 180°C. for one hour. The intrinsic viscosity of polyester at this time was reduced to 0.35. Pilling test indicated that the knitted article had excellent resistance to pilling.

The knitting step could be performed in good condition without involving filament breakage.

The knitted article was dyed under the same conditions as set forth in Example 1, and could be colored in a deep shade and without dyeing unevenness.

EXAMPLE 36

To the same polyester-forming materials as used in Example 1 were added 0.8 mole % of

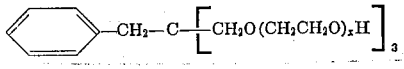

($x$ is about 6) and 1.0 mole percent of methyl benzoate were added, the amounts of both compounds being based on the dimethyl terephthalate, and a polyester having an [η] of 0.54 was prepared by polycondensation reaction in a customary manner.

The polyester was extruded in a molten state through a spinneret having 24 holes each with a diameter of 0.25 mm, wound up at a rate of about 400 meters/min., drawn to 3.6 times the original length in a water bath at about 80°C., and then heat-treated under zero tension at 145°C. for 15 minutes. The resulting filaments had a tenacity of 3.05 g/d and an elongation of 29.2 percent.

A knitted article was produced by a knitting machine using the resulting filaments, and then heat-treated at a constant length at 180°C. for one hour. The intrinsic viscosity of the polyester at this time was reduced to 0.38. Pilling test indicated that the knitted article had excellent resistance to pilling.

The production process was stable, and it was easy to control the polycondensation reaction. There was no fluctuation in the intrinsic viscosity of the polymer during the spinning step, and there were no spinneret blockage of yarn breakage. The drawing step was also performed in good condition without involving yarn breakage. The knitting step could also be performed in good condition.

The knitted article was dyed under the same condition as set forth in Example 1, and could be colored in a deep shade and without dyeing unevenness.

EXAMPLE 37

To the same polyester-forming materials as used in Example 32 0.25 mole percent based on the dimethyl terephthalate, of C[—CH$_2$O$\dashv$CH$_2$CH$_2$CH$_2$CH$_2$O)$_x$H]$_4$ ($x$ is about 5, average molecular weight 1,500 was added) a and polyester having an [η] of 0.62 was prepared by a polycondensation reaction in a customary manner.

The polyester was extruded in a molten state through a spinneret having 24 holes, each with a diameter of 0.25 mm. wound up at a rate of about 400 meters/min., drawn to 2.7 times the original length in a water bath at about 80°C., and then heat-treated under zero tension at 145°C. for 15 minutes. The resulting filaments had a tenacity of 2.75 g/d and an elongation of 29.0 percent.

A knitted article was produced by a knitting machine using the resulting filaments, and then heat-treated at a constant length at 180°C. for one hour. The intrinsic viscosity of the polyester at this time was reduced to 0.42, the tenacity to 1.88 g/d and the elongation to 20.5 percent. Pilling test indicated that the knitted article had excellent resistance to pilling.

In any of the spinning, drawing and knitting steps, no trouble occurred, and the operation could be performed in good condition.

The knitted article was dyed under the same conditions as set forth in Example 1, and could be colored in a deep shade.

EXAMPLE 38

To the same polyester-forming materials as used in Example 32 0.4 mole percent of C$\dashv$CH$_2$O$\dashv$CH$_2$C-H$_2$O)$_x$—COCH$_3$]$_4$ ($x$ is about 12, average molecular weight 2,400) and 0.5 mole percent octadecyl alcohol were added, the amounts of both compounds being based on the dimethyl terephthalate, and a polyester having an [η] of 0.58 was prepared by a polycondensation reaction in a customary manner.

The polyester was extruded in a molten state through a spinneret having 24 holes, each with a diameter of 0.25 mm, wound up at a rate of about 400 meters/min., drawn to 3.6 times the original length in a water bath at about 80°C., and then heat-treated under no tension at 145°C. for 15 minutes. The resulting filaments had a tenacity of 2.86 g/d and an elongation of 28.3 percent.

A knitted article was produced by a knitting machine using the resulting filaments and then subjected to the radiation of ultraviolet rays at 80°C. for 6 hours. The intrinsic viscosity of the polyester at this time was reduced to 0.42, the tenacity to 2.11 g/d, and elongation to 18.8 percent. Pilling test indicated that the knitted article had excellent resistance to pilling.

The production process was stable, and the polycondensation reaction could be controlled readily. The polymer did not adhere to the spinneret face at the time of spinning, and there was no occurrence of filament breakage and fuzzes. The drawing and knitting steps could be performed in good condition without any trouble.

The knitted article was dyed under the same conditions as set forth in Example 1, and could be colored in deep shade and without dyeing unevenness.

EXAMPLE 39

To the same polyester-forming materials as used in Example 32 0.6 mole percent of substance II and 0.3 mole percent of stearic acid were added, the amounts of both compounds being based on the dimethyl terephthalate, and a polyester having an [η] of 0.66 was prepared by polycondensation reaction in a customary manner.

The polyester was extruded in a molten state through a spinneret having 24 holes, each with a diameter of 0.25 mm, wound up at a rate of about 400 meters/min., drawn to 3.7 times the original length in a water bath at about 80°C., and then heat-treated under zero tension at 145°C. for 15 minutes. The resulting filaments had a tenacity of 4.18 g/d and an elongation of 38.2 percent.

A knitted article was produced by a knitting machine using the resulting filaments, and then subjected to ultraviolet ray radiation at about 80°C. for 8 hours. The intrinsic viscosity of the polyester at this time was reduced to 0.45. Pilling test indicated that the knitted article had excellent resistance to pilling.

The production process was quite stable. The control of the polycondensation reaction, and the operation of the spinning drawing, and knitting steps could be performed in good condition without involving any trouble.

The knitted article was dyed under the same conditions as set forth in Example 1, and could be colored in a deep shade and without dyeing unevenness.

We claim:

1. A fiber-forming polyester having improved dyeability and resistance to pilling consisting essentially of the reaction product of
an ester prepared from at least one acid component consisting essentially of an aromatic dicarboxylic acid or lower alkyl ester thereof and at least one alkylene glycol having 2 to 10 carbon atoms;
wherein before the completion of the polymerization reaction is added
   a. not more than Y/Y − 2 mole percent and not less than Y/15 (Y − 2) mole percent, based on the total acid component, of a polyalkylene oxide compound expressed by the general formula

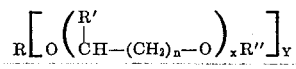

wherein R is a straight chain or cyclic aliphatic hydrocarbon having 4 to 25 carbon atoms or a Y-valent residue of an aliphatic ether having 4 to 25 carbon atoms, R' is a hydrogen atom or a lower alkyl group, n is an integer of 1 to 3, $x$ is an integer of 1 to 50, R'' is a hydrogen atom or a hydrocarbon group with 1 to 10 carbon atoms having a carboxyl group or ester thereof, or a hydroxyl group or ester thereof, and Y is an integer of 3 to 6; and
   b. $\phi$ to Y times the weight of compound (a) of an ester-forming compound having at least 7 carbon atoms, which has one —COOH, —OH, —COOR''', or —OOCR''' group, wherein R''' is a lower alkyl group; and completing the polymerization after said addition.

2. A polyester of claim 1, wherein the aromatic dicarboxylic acid is terephthalic acid, and the glycol is ethylene glycol.

3. In a process for producing improved polyesters, which comprises preparing a polyester from at least one acid component consisting essentially of an aromatic dicarboxylic acid or lower alkyl ester thereof and at least one alkylene glycol having 2 to 10 carbon atoms, the improvement wherein before the completion of the polymerization reaction,
   a. not more than Y/Y − 2 mole percent and not less than Y/15 (Y−2) mole percent, based on the total acid component, of a polyalkylene oxide compound expressed by the general formula $$R[O(CH-(CH_2)_n-O)_xR'']_Y$$

wherein R is a straight chain or cyclic aliphatic hydrocarbon having 4 to 25 carbon atoms, R' is a hydrogen atom or a lower alkyl group, n is an integer of 1 to 3, $x$ is an integer of 1 to 50, R'' is a hydrogen atom or a hydrocarbon group with 1 to 10 carbon atoms having a carboxyl group or ester thereof, or a hydroxyl group or ester thereof, and Y is an integer of 3 to 6, and
   b. 0 to Y times the weight of compound (a) of an ester-forming compound having at least 7 carbon atoms which has one —COOH, —OH, —COOR''' or —OOCR''' group, wherein R''' is a lower alkyl group;
are added to the reaction system and thereafter the polymerization is completed.

4. A process of claim 3, wherein the aromatic dicarboxylic acid is terephthalic acid, and the glycol is ethylene glycol.

5. Polyester fibers having improved dyeability and resistance to pilling consisting essentially of the reaction product of
an ester prepared from at least one acid component consisting essentially of an aromatic dicarboxylic acid or lower alkyl ester thereof and at least one alkylene glycol having 2 to 10 carbon atoms;
wherein before the completion of the polymerization reaction is added
   a. not more than Y/Y − 2 mole percent and not less than Y/15 (Y − 2) mole percent, based on the total acid component, of a polyalkylene oxide compound expressed by the general formula

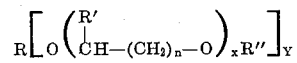

wherein R is a straight chain or cyclic aliphatic hydrocarbon having 4 to 25 carbon atoms or a Y-valent residue of an aliphatic ether having 4 to 25 carbon atoms, R' is a hydrogen atom or a lower alkyl group, n is an integer of 1 to 3, $x$ is an integer of 1 to 50, R'' is a hydrogen atom or a hydrocarbon group with 1 to 10 carbon atoms having a carboxyl group or ester thereof, or a hydroxyl group or ester thereof, and Y is an integer of 3 to 6; and
   b. $\phi$ to Y times the weight of compound (a) of an ester-forming compound having at least 7 carbon atoms, which has one —COOH, —OH, —COOR''', or —OOCR''' group, wherein R''' is a lower alkyl group; and completing the polymerization after said addition.

6. Polyester fibers of claim 5, aherein the aromatic dicarboxylic acid is terephthalic acid, and the glycol is ethylene glycol.

7. A process for producing polyester fibers having excellent resistance to pilling, which comprises melt spinning a fiber-forming polyester composition consisting essentially of the reaction product of
an ester prepared from at least one acid component consisting essentially of an aromatic dicarboxylic acid or lower alkyl ester thereof and at least one alkylene glycol having 2 to 10 carbon atoms;
wherein before the completion of the polymerization reaction is added
   a. not more than Y/Y − 2 mole percent and not less than Y/15 (Y − 2) mole percent, based on the total acid component, of a polyalkylene oxide compound expressed by the general formula

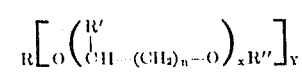

wherein R is a straight chain or cyclic aliphatic hydrocarbon having 4 to 25 carbon atoms or a Y-valent residue of an aliphatic ether having 4 to 25 carbon atoms, R' is a hydrogen atom or a lower alkyl group, $n$ is an integer of 1 to 3, $x$ is an integer of 1 to 50, R'' is a hydrogen atom or a hydrocarbon group with 1 to 10 carbon atoms having a carboxyl group or ester thereof, or a hydroxyl group or ester thereof, and Y is an integer of 3 to 6; and b. $\phi$ to Y times the weight of compound (a) of an ester-forming compound having at least 7 carbon atoms, which has one —COOH, —OH, —COOR''', or —OOCR''' group, wherein R''' is a lower alkyl group; and completing the polymerization after said addition.

* * * * *